Nov. 5, 1957  H. S. DANIEL  2,811,801
FISHING ROD HOLDER
Filed Jan. 28, 1955  2 Sheets-Sheet 1
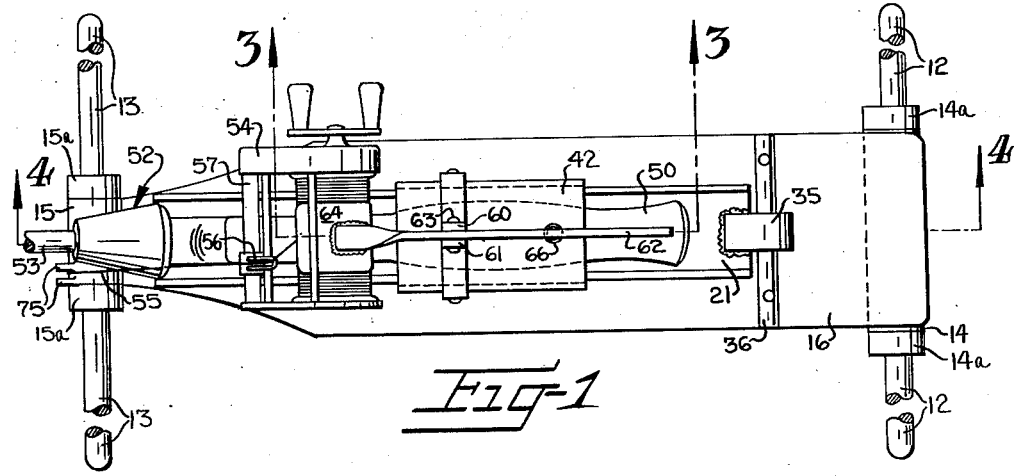
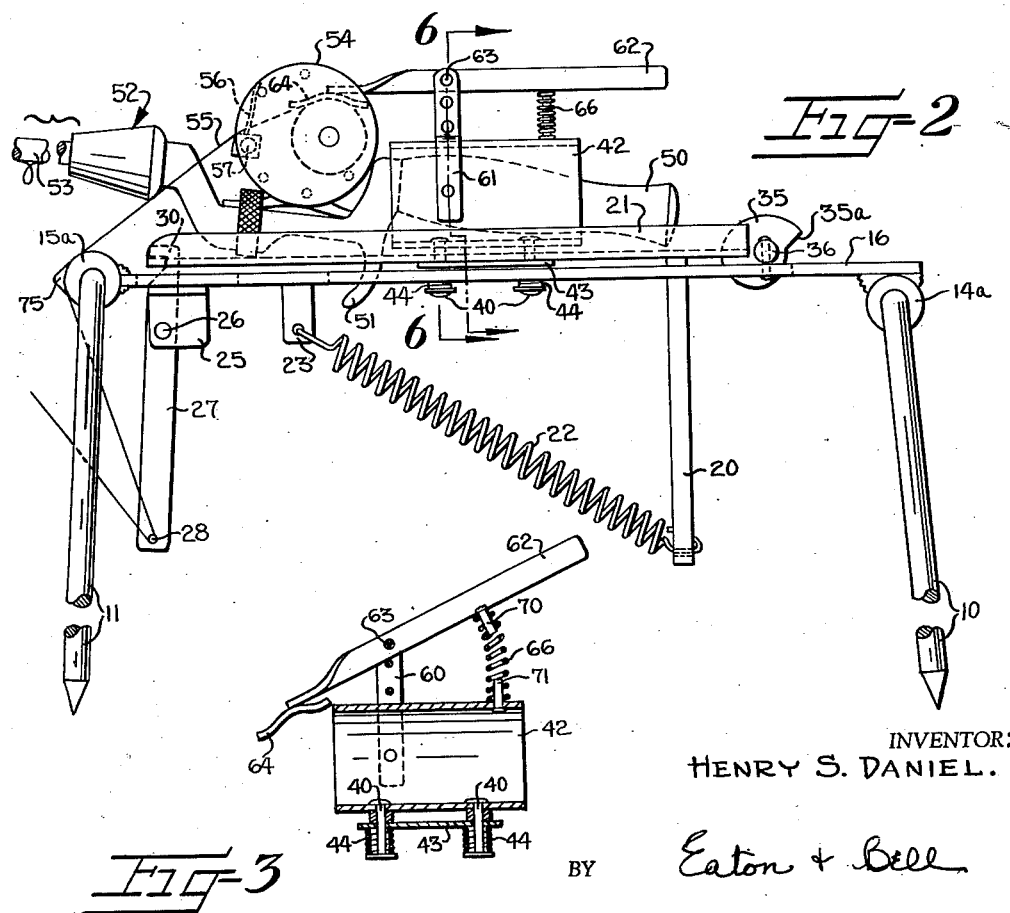
INVENTOR:
HENRY S. DANIEL.
BY Eaton & Bell
ATTORNEYS Nov. 5, 1957     H. S. DANIEL     2,811,801
FISHING ROD HOLDER
Filed Jan. 28, 1955     2 Sheets-Sheet 2
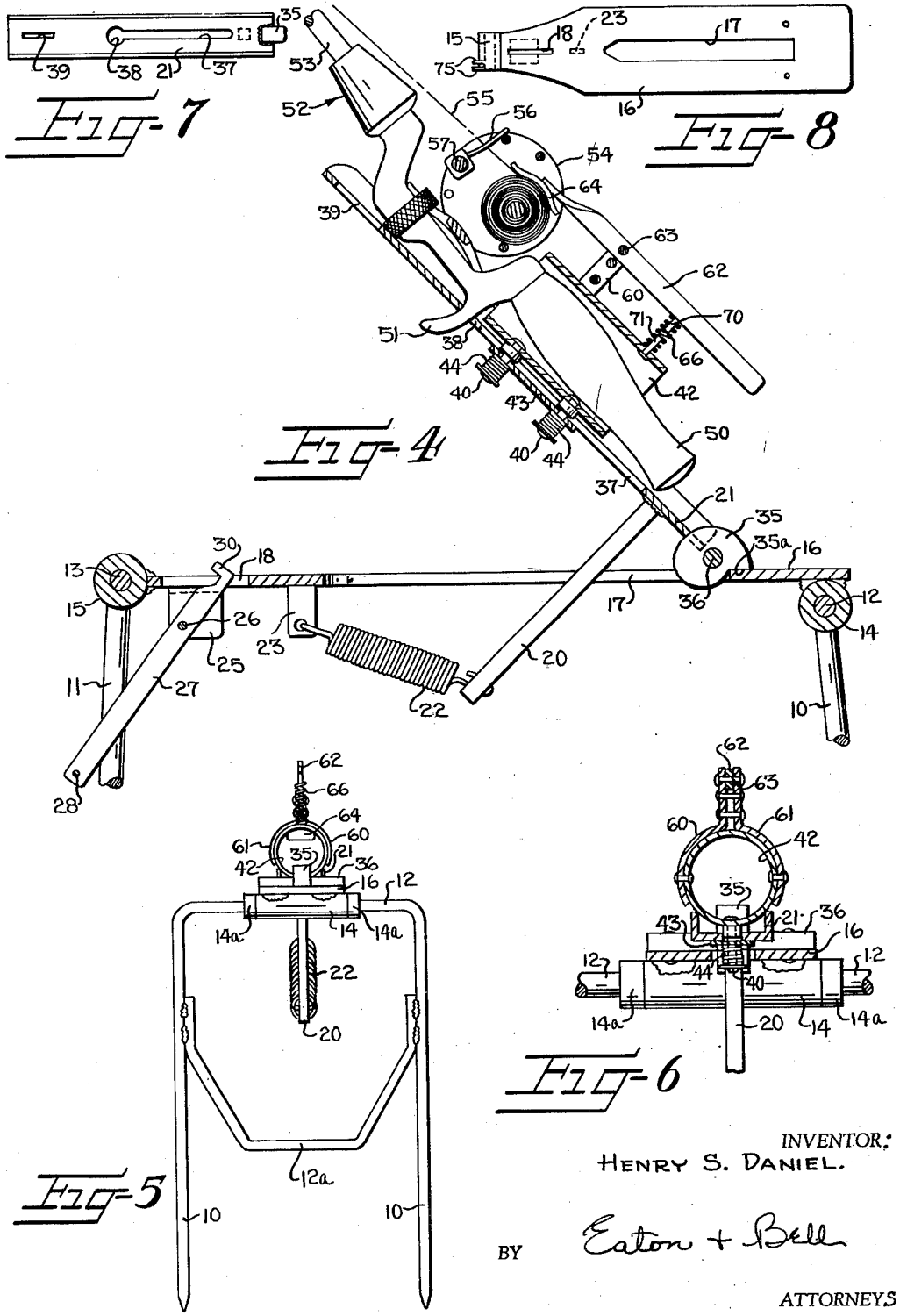
INVENTOR:
HENRY S. DANIEL.
BY Eaton + Bell
ATTORNEYS

2,811,801

FISHING ROD HOLDER

Henry S. Daniel, Kannapolis, N. C.

Application January 28, 1955, Serial No. 484,609

2 Claims. (Cl. 43—15)

This invention relates to a rod and reel holder and especially one which will hold the rod and reel and upon the bite of a fish will automatically trip the holding means to cause the holding means to impart a jerk to the line and the hook carried thereby so as to ensnare the fish thereon.

Various attempts have been made to provide automatic fishing devices but they have been complicated and have not resulted in widespread use of the same.

It is an object of this invention to provide a device adapted to be placed preferably upon the bank of a stream in which fishing is to be done and as one well knows, sometimes a fisherman has a plurality of these rods and reels with which he is fishing and it is almost impossible to hold more than one, and at the outside two, in a fishing operation, whereas if he has a plurality of these holding devices in operation, he can put a rod and reel on each one and ensnare the fish when it bites. He can take the rod and reel from the holding means and wind up the fish and re-bait his hook and recast and place the same in one of the holding devices to await the bite of another fish.

Some of the objects of the invention having been stated, other objects will appear as the description proceeds when taken in connection with the accompanying drawings in which—

Figure 1 is a plan view of the apparatus showing the outer end of the rod broken away;

Figure 2 is a side elevation looking at the lower side of Figure 1;

Figure 3 is a longitudinal vertical sectional view through the rod holding and braking means disassociated from the other mechanism;

Figure 4 is a longitudinal sectional view taken substantially along the line 4—4 in Figure 1, but showing the rod and reel tripped after having received the bite of the fish on the same;

Figure 5 is a view looking at the right-hand end of Figure 2 with the rod and the reel disassociated therefrom;

Figure 6 is a transverse vertical sectional view looking along the line 6—6 in Figure 2, but showing the rod and reel mechanism disassociated therefrom;

Figure 7 is a view of the pivoted bracket for holding the rod and reel mechanism;

Figure 8 is a vertical plan view of the main or stationary bracket supported by the legs of the apparatus.

Referring more specifically to the drawings, the numerals 10 and 11 indicate the respective rear and front legs of the fishing rod holder, both of these legs 10 and 11 being joined together at their upper ends by respective horizontal portions 12 and 13 and braced intermediate their upper and lower ends by strap members 12a and 13a, only the strap member 12a being shown in the drawings (Figure 5). The strap members 12a and 13a not only act as bracing members for the legs 10 and 11, but also provide means whereby the foot of the user can be placed on the same for sinking the legs into the ground or for holding the same in poistion if a large fish should be caught on the rod and reel.

The horizontal portions 12 and 13 of the legs 10 and 11 are pivoted in bearings 14 and 15 fixedly secured at opposite ends of a main bracket 16 which is slotted at 17 and 18 (Figures 4 and 8), the slot 17 being provided for a passageway in the bracket 16 for an arm 20, the upper end of which is fixedly secured to a pivoted bracket 21, the lower end of which has one end of a spring 22 suitably secured thereto and the other end of which is secured on a spring anchor 23. The spring anchor 23 is fixed on the lower surface of the pivoted bracket 21 (Figures 2, 4 and 8). The bracket 16 is also provided with a pair of downwardly extending plates 25 suitably secured adjacent opposite sides of the slot 18 which support and has a trigger or latch 27 pivotally mounted as at 26. The trigger 27 has a laterally projecting pin 28 at its lower or free end and has a hooked portion 30 provided at its upper or working end extending through the slot 18 in the main bracket 16. The pivoted bracket 21 has a hub or cam member 35 fixedly secured in a cut-out at the rear end thereof and pivoted on a shaft 36 fixed transversely of and one the main bracket 16. The cam 35 has rotative movement in the slot 17 and has a projection or cam surface 35a thereon which is adapted to, at times, engage the bracket 16 and to thereby limit upward movement of the pivoted bracket 21.

The pivoted bracket 21 has a slot 37 therein which is in vertical alinement with the slot 17 in the bracket 16 and has an enlarged forward end 38 (Figures 4 and 7). The pivoted bracket 21 also has a slot 39 therein which is in vertical alinement with the hooked end 30 of the trigger 27. A pair of shouldered pins 40 are fixedly secured at their upper ends in a tubular member 42 and the shouldered portions thereof extend into the slot 37 in the pivoted bracket 21 and are reduced to pass through a plate member 43 which is wider than the width of the slot 37 and is resiliently urged into engagement with the pivoted bracket 21 as by a pair of compression springs 44 which surround the pins 40 and engage the plate 43. The springs 44 and the plate 43 allow lateral movement of the tubular member 42 along the length of the slot 37 but resiliently hold the tubular member 42 in the position placed by an operator. The tubular member 42 provides a support or holding member for the handle 50 of a conventional casting rod broadly referred to at 52.

The conventional casting rod 52 also includes a finger rest 51 which is adapted to be placed in the enlarged opening 38 at the forward end of the slot 37 in placing the conventional rod in the improved fishing rod holder. The casting rod 52 is provided with the usual flexible rod 53 as well as a conventional reel 54 having a fishing line 55 wrapped around the spool thereof and passing through a conventional feed eye 56 which is a winding apparatus mounted on a threaded rod 57 for traversing the width of the reel 54.

The tubular member 42 is provided with a pair of strap members 60, 61 fixedly secured thereto which extend partially therearound and upwardly therefrom to provide a support for a brake arm 62 pivotally secured between the strap members as at 63. The forward end of the brake lever 62 is provided with a brake pad 64 which is adapted to ride on the spool of fishing line when the casting rod 52 is placed in the pivoted bracket 21 and is urged into engagement with the same by a compression spring 66. The upper end of the spring 66 is held in position on the brake lever 62 by a spring perch 70 and the lower end of which is held in position on the tubular member 42 by an upwardly extending spring perch 71.

In operation, the legs 10 and 11 of the fishing rod holder are placed in the ground adjacent the edge of the water and the bait is cast in the conventional manner with the casting rod and reel and upon the slack in the line being taken up by the reel, the rod and reel is then fitted into the fishing rod holder. The tubular member 42 is moved rearwardly in the slot 37 so that the handle portion 50 of the casting rod may be easily placed therein and the trigger or finger support 51 is placed in the enlarged portion 38 of the slot 37, after which the tubular member 42 is moved forwardly to the position shown in Figures 2 and 4 to thus hold the rod and reel and rigidly support the same on the pivoted bracket 21. The fishing rod holder is then moved to cocked position by exerting downward pressure on the forward end of the pivoted bracket 21 until the slot 39 in the pivoted bracket 21 may be engaged by the hook member 30 on the trigger 27 to hold the same downwardly in the position shown in Figure 2 and to thus stretch the tension spring 22 to the position shown in Figure 2. The fishing line 55 is then led downwardly from the rod 53 under the laterally projecting pin 28, upwardly between a pair of spaced projections 75 on the front edge of the bearing 15 (Figures 1 and 2), and through the feed eye 56 to be wound onto the spool of fishing line in the reel 54. Any remaining slack in the line 55 is then taken up by the reel 54 and the fishing rod holder is then in cocked position with the brake pad 64 resting on the spool of fish line to provide a bracket therefor. Upon a fish taking the bait, a slight tug will be given on the line 55 to move the lower end of the trigger 27 in a clockwise direction to thus cause the upper hooked end 30 to move out of engagement with the pivoted bracket 21 and into the open slot 39. With the front end of the bracket free of the trigger 27, the tension spring 22 will cause the pivoted bracket 21 to move from the position shown in Figure 2 to the position shown in Figure 4 instantly to give the line 54 a sudden jerk and set the hook in the fish's mouth.

The fisherman may then remove the line 55 from around the pin 28 so that the line 55 will follow the length of the fishing rod 53 and reel the fish in with the conventional reel 54, with or without removing the rod and reel from the rod holder.

It is thus seen that I have provided a fishing rod and reel holder which will hold a rod and reel in fishing position and which holder will automatically set the hook in the fish's mouth upon the fish taking the hook attached to the end of the line, the holder being constructed to allow quick reception of or quick release of the rod and reel held thereby.

Suitable collars 14a and 15a are fixed on respective horizontal portions 12 and 13 of the legs 10 and 11 and adjacent opposite sides of the bearings 14 and 15 to prevent sidewise movement of the bracket 16.

In the drawings and specification, there has been set forth a preferred embodiment of the invention and although specific terms are employed, they are used in a generic and descriptive sense only and not for purposes of limitation, the scope of the invention being defined in the claims.

I claim:

1. A fishing rod and heel holder comprising a main bracket having a longitudinally extending slot, means for securing the same to a suitable support such as the ground, a second bracket pivoted on the main bracket, stop means secured to said second bracket for engaging the main bracket for limiting upwardly pivotal movement of the second bracket, a tubular member slidably mounted on said second bracket for holding the stock of the rod and reel, means secured to said tubular member for engaging the line on the reel for applying a drag thereto, a trigger pivotally mounted on the main bracket and its upper end adapted to engage the second bracket for holding the free end thereof in lowered position, resilient means secured to said second bracket and said main bracket urging the free end of said second bracket upwardly, and the lower free end of the trigger having line receiving means whereby the line from the reel is adapted to be passed over the front end of the main bracket and then under the line receiving means on the lower end of the trigger and then along the rod whereby a pull on the end of the line will release said trigger to cause the second bracket, together with the rod and reel, to raise upwardly.

2. A fishing rod and reel holder comprising a first main bracket, support legs secured to said main bracket for maintaining the same substantially horizontally to a supporting surface, a second bracket pivotally mounted at one end to said main bracket, stop means on said second bracket engageable with said main bracket for limiting pivotal movement of said second bracket, a tubular member slidably mounted on said second bracket, a brake lever oscillatably mounted intermediate its ends on said tubular member, a brake pad mounted on one end of said brake lever, a resilient member between said tubular member and said brake lever for urging said brake pad into engagement with said reel, said main bracket having first and second openings therein, an outwardly projecting arm secured on said second bracket and extending through said first opening in said main bracket, a resilient member secured to said arm and said main bracket for urging the free end of said second bracket away from said main bracket, a normally vertically positioned trigger pivotally mounted intermediate its ends on said main bracket, said trigger having a first end extending through said second opening in said main bracket and a second end extending from said main bracket, a latch on said first end of said trigger for engaging the free end of said second bracket, and fishing line receiving means on said second end of said trigger for actuating said trigger to release said latch from said second bracket upon a pull being exerted on the line.

References Cited in the file of this patent

UNITED STATES PATENTS

| | | |
|---|---|---|
| 1,819,034 | Luelloff | Aug. 18, 1931 |
| 2,204,692 | Parisio | June 18, 1940 |
| 2,238,127 | Nissen | Apr. 15, 1941 |
| 2,473,778 | Benes | June 21, 1949 |
| 2,496,090 | Grohs | Jan. 31, 1950 |
| 2,618,090 | Kimura | Nov. 18, 1952 |
| 2,657,492 | Skorr | Nov. 3, 1953 |